United States Patent Office 3,838,190
Patented Sept. 24, 1974

3,838,190
PROCESS FOR THE REMOVAL OF MERCURY
FROM GASES
Lutz Georg Birke, Oslo, Aksel Jebens, Hosle, Ivar Eystein, Ruyter, Oslo, and Froystein Dyvik, Odda, Norway, assignors to Det Norske Zinkkompani A/S, Odda, Norway
No Drawing. Filed Jan. 10, 1972, Ser. No. 216,807
Claims priority, application Norway, Jan. 14, 1971, 133/71
Int. Cl. B01d 53/34
U.S. Cl. 423—210                             4 Claims

ABSTRACT OF THE DISCLOSURE

Removal of mercury from gases, in particular gases from combustion or roasting, is achieved by washing the gases with sulphuric acid of at least 50% having a temperature of 60 to 180° C. The washing acid and the gases contain chlorine or chlorine compounds or both chlorine and chlorine compounds in such an amount that the atomic ratio Cl/Hg is at least 1:1. Practically all mercury and other mercury compounds are converted to mercury chlorides which are separated by condensation in a succeeding cooling of the gas.

---

The present invention relates to a process for removing mercury contaminations from gas mixtures. Gas mixtures formed during oxidation processes are particularly contemplated. As examples may be mentioned the gases which arise during the combustion or roasting of sulphide containing ores. Other gases which also may be purified are gases from electrolysis vessels and cells.

The gas mixtures in question usually contain a number of different contaminations. The contaminations occur as larger or smaller particles, but also as gas or liquid in elementary or molecularly bound form. The particles or the drops often have an electric charge. In order to avoid contamination of both the natural environment and the useful products which can be recovered from the gas mixtures, these gas mixtures can be purified by putting them through complex purification processes. Such processes usually involve several individual operations carried out successively, such as dust separation (cyclone), gas washing (scrubber), electro filtration, gas drying etc.

The mode of action for these purification steps may be based upon different basic physical operations such as: sedimentation, absorption, adsorption and condensation. These operations are often used in combination. It is usual that the gas mixtures to be purified have a relatively high temperature. As the gas mixtures pass through the individual purification stages the heat is conducted away and the temperature decreases. The saturation pressure of the gaseous contaminations is then correspondingly lowered so that they condense and may be separated off mechanically. However, mercury presents specific difficulties, since chemical and/or physical compounds are formed which may escape the conventional purification processes. Such compounds are particularly formed in the presence of water, chalkogen and chalkogen compounds in the gas mixture (i.e. such as water, sulphur and sulphur oxides).

Different methods are available for the removal of mercury contaminations from roasting gas and similar gas mixtures.

The gas mixtures may be washed with concentrated (60–100%) hot (60–230° C.) sulphuric acid ($H_2SO_4$). The mercury contaminations thereby form mercury(I) and mercury(II)sulphate. The acid is gradually removed from the washing system, and mercury salts may be precipitated from the acid by cooling. The sulphuric acid, which has then been more or less freed of mercury, is recirculated in the washing system.

This method is somewhat complicated in practice since reactions between the mercury/mercury compounds and the chlorine/chlorine compounds also present in the system to form mercury(I)chloride and mercury(II)chloride occur simultaneously with the mercury sulphuric acid reaction. Both mercury(I) and mercury(II)chlorides are volatile at the most commonly employed washing temperatures, and are therefore not absorbed by the washing acid. Moreover, the recovery of mercury from the sulphuric acid is a laborious process.

In another method the gas mixtures are brought in close contact with the element sulphur. The element selenium (Se) may also be used. The mercury content in the gas mixture thus reacts to form HgS or HgSe. The reaction proceeds particularly rapidly if the elements exist in "status nascendi." Good contact between the gas mixture and the elements is obtained by providing the elements in finely divided form in the liquid used for the washing of the gas mixtures. This method is, however, not very applicable for purification of large amounts of gas containing a relatively high amount of mercury (10–500 mg./m.³ or more).

In the literature (Brit. J. Industr. Med., 1966, 23, p. 230 and J. Chem. Soc. (A), 1967, p. 545) it is stated that mercury-containing air which is in contact with an aqueous solution of mercury acetate requires an essentially lower partial pressure of metallic mercury when halogens are added to the solution. Experiments were made with molar ratios of halogen/mercury from 10:1 to 10,000:1, so that a large part of the divalent mercury presumably is complex bound, as for instance $HgX_4^{--}$ (X=halogen). Further, the following reaction equation is given for absorption of metallic mercury:

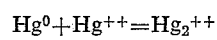
$$Hg^0 + Hg^{++} = Hg_2^{++}$$

according to which divalent mercury ions in the solution react with metal vapour in the gas. By studying the above equation it will be seen that the absorption of metallic mercury resuls in a reduction of divalent mercury ions present in the solution, so that in order to make this absorption continuous, the monovalent mercury ions must be oxidized back to divalent mercury ions. This may be done by adding a suitable oxidizing agent which does not contaminate the system.

The oxidation of metallic mercury with divalent mercury may be used for the absorption of metallic mercury in vapour form from gases, but it cannot be expected to achieve the absorption of all the mercury which has been bound in some way or other. Thus, adducts between mercury/mercury compounds, sulphur trioxide and water, for example in the form of a fog, will to a great extent be able to pass through a normally available washing system.

The recent invention provides process for the removal of mercury from gases, such as roasting gases, combustion gases or electrolysis gases. The process is characterized in that the gases are washed with sulphuric acid of at least 50% having temperature of 60–180° C., and that the washing acid and the gases contain chlorine and/or chlorine compounds in such an amount that the atomic ratio Cl/Hg is at least 1:1, to convert practically all the mercury and all the mercury compounds into mercury chlorides which are separated by condensation in the succeeding cooling of the gas.

The use of washing acid consisting of at least 50% sulphuric acid results in the oxidation or decomposition of the mercury compounds, such as those forming the above mentioned adducts, which would normally manage to pass through the system, so that they can then immediately react to form mercury chloride. To convert all the mercury into mercury chloride, particularly mercury(I)chloride, provisions are made so that the gas and the washing acid contain chlorine in an atomic amount which is at least as high as the atomic amount of mercury. The mercury chloride formed escapes and is then condensed in a suitable manner.

What presumably happens during the process is that metallic mercury reacts with divalent mercury in the washing acid to form monovalent mercury (1), some of this monovalent mercury is oxidized by the sulphuric acid back to divalent mercury (2), while the remaining part of the monovalent mercury formed reacts with chloride ions to form mercury(I)chloride (3). The total course of reaction can then be illustrated as follows:

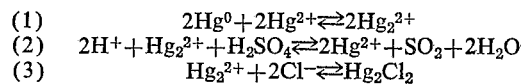

(1) $2Hg^0 + 2Hg^{2+} \rightleftharpoons 2Hg_2^{2+}$
(2) $2H^+ + Hg_2^{2+} + H_2SO_4 \rightleftharpoons 2Hg^{2+} + SO_2 + 2H_2O$
(3) $Hg_2^{2+} + 2Cl^- \rightleftharpoons Hg_2Cl_2$

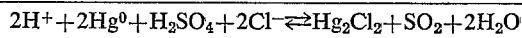

$2H^+ + 2Hg^0 + H_2SO_4 + 2Cl^- \rightleftharpoons Hg_2Cl_2 + SO_2 + 2H_2O$

Atomic mercury will to a certain extent be absorbed by the sulphuric acid, but as is clear from the above equation (1), this absorption will be promoted if divalent mercury is present in the acid. It is therefore desirable that traces of mercury compounds be added to the acid before the washing is started, in order that the process may start at its full efficiency. After the process has started it seems as if the concentration of divalent mercury in the washing acid is stabilized at a certain value.

The concentration of the sulphuric acid should preferably be the same during the whole process. Therefore, no water should be condensed, and no water, sulphuric acid or sulphur trioxide should be evaporated. This is suitably achieved by maintaining the temperature of the washing acid between 60° and 180° C.

If the gas to be purified does not contain sufficient chlorine or chlorine compound to react with all the mercury, chlorine or some chlorine compound must be added. A chlorine compound or chlorine may be added to the washing liquid, but it is to be preferred that chlorine or gaseous hydrogen chloride is added to the gases before they are washed with the sulphur acid. By cooling the gases before washing it is thereby possible to separate out a substantial part of the mercury chloride formed.

Gases from roasting or combustion normally contain solid particles which should be removed before the washing. It is suitable to add chlorine and/or chlorine compounds to the gas by adding chlorine and/or one or more chlorine compounds to the raw material used in the combustion or roasting. If desired, volatile chlorine compounds and/or chlorine may be provided together with the air of combustion, and chlorine compounds which are decomposed under the roasting conditions to provide chlorine and/or volatile chlorides may also be added to the above mentioned raw material.

During experiments with roasting gas it has been found that mercury chloride is also formed without any acid washing. Obviously, a spontaneous parallel reaction takes place in the gaseous phase, for example according to the reaction scheme:

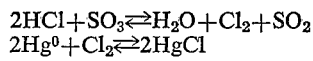

$2HCl + SO_3 \rightleftharpoons H_2O + Cl_2 + SO_2$
$2Hg^0 + Cl_2 \rightleftharpoons 2HgCl$ since there will always be $SO_3$ present in roasting gas. However, the acid washing has the effect that the mercury bound to sulphuric acid fog can also form mercury chloride.

By washing the gas with sulphuric acid the ability of the surphuric acid to break down the mercury-containing compounds which are difficult to remove, f. inst. the above adducts is utilized. Chlorine/chloride compounds thereby receive the opportunity of reacting with these mercury contaminations which prior to the acid washing could not react with chlorine/chlorine compounds.

If chlorine/chlorine compounds are present in the gaseous phase a reaction takes place therein between chlorine/chlorine compounds and mercury/mercury compounds, whereby mercury chlorides are formed, primarily mercury(I)chloride. As stated above these salts may be separated from the gas mixture by means of direct or indirect cooling after washing with the acid. For indirect cooling the surface of the heat exchanger should be cleaned by permitting water to run down along the gas side. In this manner the cooler can simultaneously be used for gas drying, since some of the content of water vapour in the gas mixture is thereby condensed.

To illustrate the invention more clearly an example of the technique used will be presented:

The gas mixture is conveyed from a combustion chamber or roasting kiln through tubing into a cyclone (separation of coarse particles). The gas is then cooled to 180–250° C. in a heat exchanger, in which the heat conveyed away is utilized for stream production. A connected dry electro filter (EGR) removes the finer particles from the gas. The gas mixture is then passed into a washing system in which a particularly good contact between 50–90% sulphuric acid at 60–180° C. and the gas is provided. Such good contacts are preferably obtained by using a column having two or more bubble cap plates, sieve plates or the like. After having passed the washing stage the gas is further cooled to about 20–35° C. to achieve the separation of the mercury salts. Here it may be advantageous to employ indirect cooling with a heat exchanger and to have water running down the latter's surface on the gas side. The efficiency of the separation of mercury chlorides depends on the construction of the cooler. The rest of the mercury chlorides which possibly pass the cooler—possibly also as aerosols—are separated out in a wet electro filter, which is the last stage of the purification process.

Cooling water from the gas cooler (either water from direct cooling or rinsing water from indirect cooling) is circulated in a closed circuit in which the mercury chloride is separated from the water. Water condensed from the gas mixture is removed from the closed water circuit and goes into the sewage system after the final purification.

The washing acid must from time to time be replaced in a technical process due to the contaminations which arise. Circulation of the acid is not necessary unless the acid is to be used for cooling of the gas. If the gas is cooled in some other manner before washing it with the acid it is possible to avoid expensive treatment in connection with cooling and circulation of the washing acid. The concentration of the washing acid automatically adjusts itself at the desired operation temperature.

EXAMPLE

In a zinc or fluo-solids roasting plant a stream of the hot gases leaving the dry electrostatic precipitator was led to a small pilot plant, having as its main components a thermostated reactor with concentrated sulphuric acid and a water cooled glass gas cooler.

The reactor consisted of a 10 l. spherical glass vessel filled with glass rings and half filled with the acid. Initial concentration of the acid was 85% $H_2SO_4$, and the vessel was thermostated at temperatures from 135° to 180° C.

The hot gases containing approximately 100 g./Nm.³ $H_2O$ and 100 mg. HCl/Nm.³ and 30 mg. Hg./Nm.³ were fed to the reactor with a temperature of 220° C., and with a flowrate of approximately 5 Nm.³/h. In the cooler the gas was cooled to approximately 20° C.

At intervals samples were drawn of the hot roaster gas, of the strong sulphuric acid in the reactor, of the condensed water in the gas cooler and of the cold gas passing the cooler. The experiment was run continuously for 91 hours, and nearly 500 Nm.³ gas was treated.

It was found, that in the initial phase there was a gradual increase of the Hg content in the sulphuric acid, until an equilibrium value of 385 mg./kg. was reached. The acid concentration automatically adjusts itself to a value depending upon the water vapour pressure and the actual temperature—in the region of 80–90% $H_2SO_4$ during the test.

The condensate from the cooler was collected and analyzed for mercury. Here a white precipitation of mercurous chloride was observed.

The mercurous chloride is formed as a direct condensation product or by a secondary reaction in the water phase by reduction of mercuric chloride with the $SO_2$ present. The mercurous chloride is very sparingly soluble, and was separated from the water phase by decantation and filtration.

In the gases passing the cooler Hg concentrations of approximately 1–3 mg./Nm.$^3$ were found. In a technical operation most of this will be removed in a subsequent electrofilter or another dust-removing equipment. There was no metallic mercury vapour present in these gases.

What is claimed is:

1. A process for the removal of mercury from gases comprising washing the gases with sulfuric acid of a concentration of at least 50% having a temperature of 60° C. to 180° C. wherein the washing acid and the gas contain chlorine and/or hydrogen chloride in such an amount that the atomic ratio Cl/Hg is at least 1:1, whereby practically all mercury and other mercury compounds are converted to mercury chlorides and volatilized, and thereafter cooling the gas and separating said mercury chlorides from the gas by condensation.

2. Process according to claim 1, characterized in that chlorine and/or gaseous hydrogen chloride is added to the gases before they are washed with the sulphuric acid.

3. Process according to claim 1, in which the gases to be purified are from a combustion or roasting, characterized in that chlorine and/or hydrogen chloride are added to the gases by adding to the starting material for the combustion or roasting chlorine and/or one or more chlorine compounds, or which decompose to yield chlorine or hydrogen chloride at the temperature of roasting or combustion.

4. Process according to claim 1 characterized in that traces of mercury compounds are added to the washing acid prior to its contact with the gases.

References Cited

UNITED STATES PATENTS 3,677,696   7/1972   Bryk et al. _____ 55—72

FOREIGN PATENTS 1,207,215   9/1970   Great Britain _____ 204—99

EARL C. THOMAS, Primary Examiner

U.S. Cl. X.R.

204—99; 423—491